US012519208B2

(12) United States Patent
Rashidian et al.

(10) Patent No.: US 12,519,208 B2
(45) Date of Patent: Jan. 6, 2026

(54) PHASED ARRAY MILLIMETER-WAVE RING ANTENNA EMBEDDED IN PRINTED CIRCUIT BOARD WITH ULTRA WIDE-BAND PERFORMANCE

(71) Applicant: PERASO TECHNOLOGIES INC., Toronto (CA)

(72) Inventors: Atabak Rashidian, Toronto (CA); Nima Bayat-Makou, Thornhill (CA); Marc Supinski, Toronto (CA); Mihai Tazlauanu, Markham (CA)

( * ) Notice: Subject to any disclaimer, the term of this patent is extended or adjusted under 35 U.S.C. 154(b) by 320 days.

(21) Appl. No.: 17/933,584

(22) Filed: Sep. 20, 2022

(65) Prior Publication Data

US 2023/0092161 A1 Mar. 23, 2023

Related U.S. Application Data

(60) Provisional application No. 63/246,166, filed on Sep. 20, 2021.

(51) Int. Cl.

| | |
|---|---|
| ***H01Q 1/22*** | (2006.01) |
| ***H01Q 1/24*** | (2006.01) |
| ***H01Q 21/24*** | (2006.01) |
| ***H01Q 21/28*** | (2006.01) |

(52) U.S. Cl.

CPC .......... *H01Q 1/2283* (2013.01); *H01Q 1/243* (2013.01); *H01Q 21/24* (2013.01); *H01Q 21/28* (2013.01)

(58) Field of Classification Search

CPC ...... H01Q 1/2283; H01Q 1/243; H01Q 21/24; H01Q 21/28; H01Q 9/0414; H01Q 9/0464; H01Q 21/065

See application file for complete search history.

(56) References Cited

U.S. PATENT DOCUMENTS

| | | | | |
|---|---|---|---|---|
| 2019/0305432 | A1* | 10/2019 | Kim | H01Q 1/38 |
| 2021/0013582 | A1* | 1/2021 | Rashidian | H01Q 1/16 |
| 2023/0335894 | A1* | 10/2023 | Kamyshev | H01Q 9/0414 |

* cited by examiner

*Primary Examiner* — David E Lotter

(74) *Attorney, Agent, or Firm* — Perry + Currier Inc.

(57) ABSTRACT

An antenna assembly configured to operate in a millimeter wave frequency of 30 GHz to 300 GHz, the antenna assembly being formed from a multi-layer printed circuit board having a plurality of eight square radiating rings positioned at generally equidistant locations within and surrounded by a rectangular grounded external ring which is positioned at the perimeter of the assembly. The antenna assembly also includes a plurality of feed network layers with a radio frequency chip and a baseband chip mounted onto the top of the plurality of feed network layers for controlling the operation of the eight square radiating rings.

15 Claims, 11 Drawing Sheets

PHASED ARRAY MILLIMETER-WAVE RING ANTENNA EMBEDDED IN PRINTED CIRCUIT BOARD WITH ULTRA WIDE-BAND PERFORMANCE

CROSS-REFERENCE TO RELATED APPLICATION

The present application claims priority to U.S. Provisional Patent Application Ser. No. 63/246,166, of same title, filed Sep. 20, 2021, the entire disclosure of which is incorporated herein by reference in its entirety for all purposes.

FIELD

The present application relates to antenna assemblies for wireless communication.

BACKGROUND

The performance of wireless antenna arrays (including sets of printed antenna circuits) is dependent, in part, on the precision antenna geometry and the characteristics of the antenna substrate—the material between the antenna elements and the ground layer, which is typically a dielectric material supporting the antenna elements. Certain substrate materials, as well as assembly configurations, have superior performance characteristics to others, but may also be costlier to fabricate, have larger physical footprints, and the like.

It has proven difficult to design an antenna assembly that is suited for operation in the millimeter-wave frequencies that also has: (a) high gain, (b) sufficient bandwidth, and (c) is steerable.

SUMMARY

An aspect of the present system provides an antenna assembly configured to operate in a millimeter wave frequency of 30 GHz to 300 GHz, with the antenna assembly being formed from a multi-layer printed circuit board having a grounded external ring surrounding a plurality of radiating rings.

A particular aspect of this system provides an antenna assembly, comprising a multi-layer printed circuit board formed from a plurality of layers printed on top of the other, the multi-layer printed circuit board including: (a) a plurality of radiating rings embedded within the multi-layer printed circuit board; (b) an external ring embedded within the multi-layer printed circuit board, the external ring surrounding the plurality of radiating rings; and (c) a plurality of feed network layers. A radio frequency chip and a baseband chip may be attached onto the surface of the uppermost feed network layer.

In preferred embodiments, the plurality of radiating rings comprise eight square radiating rings surrounded by one large rectangular external ring. Preferably, the eight square radiating rings are positioned at spacings equidistantly apart from one another within the rectangular external ring. In preferred embodiments, the eight square radiating rings are arranged in two rows of four rings.

In preferred aspects, the radiating rings are printed onto one layer of the printed circuit board and the external ring is printed onto another layer of the printed circuit board. In one preferred aspect, the external ring layer is between the radiating ring layer and the feed network layers.

An advantage of the present system, as tested by the Applicant, is that it operates well in the millimeter wave frequency of 30 GHz to 300 GHz in general and in the WiGig frequency range of 57 to 71 GHz in particular. The present antenna assembly has been experimentally tested, and proven to show: (a) high gain, (b) sufficient bandwidth, and (c) be steerable. In addition, the present system is provided in a manner that minimizes fabrication cost and complexity.

BRIEF DESCRIPTION OF THE DRAWINGS

FIG. 5 is a bottom layer (i.e.: Layer 1) of the assembly.

FIG. 6 is a third layer of the assembly.

FIG. 7 is a fourth layer of the assembly.

FIG. 8 is a fifth layer of the assembly.

FIG. 9 is a sixth layer of the assembly.

FIG. 10 is a seventh layer of the assembly.

FIG. 11 is an eighth layer of the assembly.

DETAILED DESCRIPTION

Figure 1A:
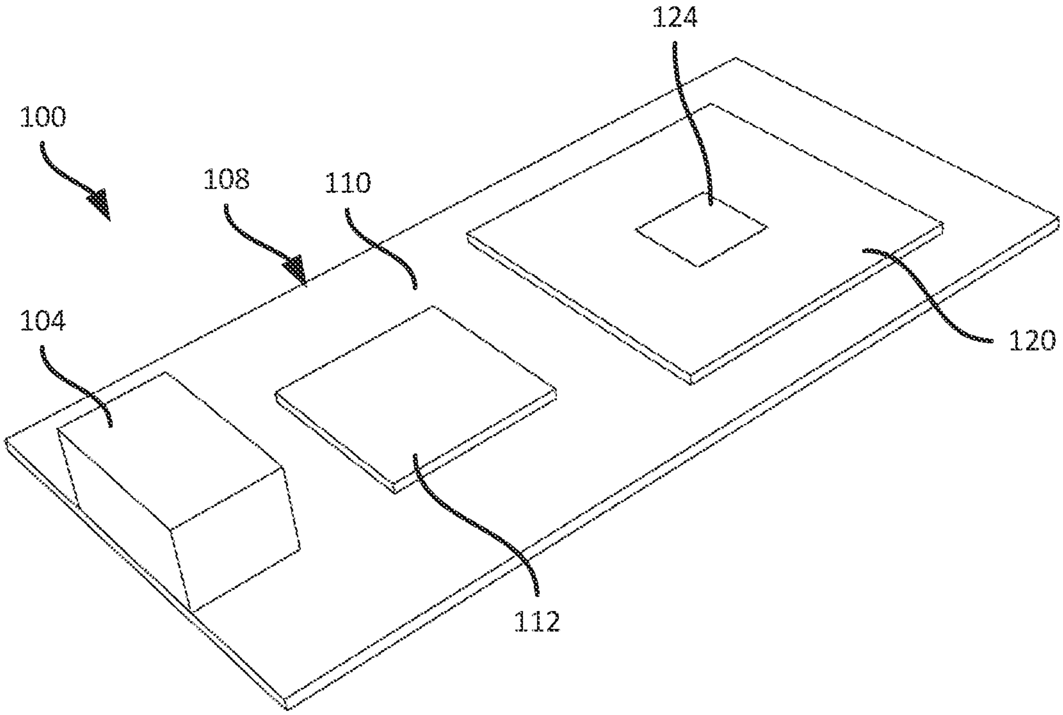
FIGS. 1A and 1B depict perspective views of a communications assembly, from above and below, respectively.

FIG. 1A depicts an example wireless communications assembly 100, also referred to as a radio frequency (RF) module 100 or simply the module 100, in accordance with the teachings of this disclosure. The module 100, in general, is configured to enable wireless data communications between computing devices (not shown). In the present example, the wireless data communications enabled by the module 100 are conducted according to the Institute of Electrical and Electronics Engineers (IEEE) 802.11ay standard, also referred to as the second WiGig standard, which employs frequencies of about 57 GHz to about 71 GHz, across six channels, each with a bandwidth of 2.16 GHz (centered at frequencies of 58.32 GHz, 60.48 GHz, 62.64 GHz, 64.8 GHz, 66.96 GHz, and 69.12 GHz) and which includes multiple-input-multiple-output (MIMO) functionality with up to 4 streams. As will be apparent, however, the module 100 may also enable wireless communications according to other suitable standards, employing other frequency bands.

RF modules configured to communicate via standards such as WiGig may be subject to competing constraints. A first example of such constraints includes strict fabrication tolerances to provide desired performance attributes such as antenna bandwidth (e.g., to cover all six of the above-mentioned channels). A second example constraint is a reduction in production complexity and cost. As will be apparent to those skilled in the art, the above constraints may be in conflict, in that fabricating wireless communications assemblies to satisfy strict tolerances tends to increase cost and complexity of fabrication. As will be discussed below, the module 100 includes various features to enable the provision of certain desirable performance attributes (such as full spectrum coverage of the WiGig frequency band) while mitigating the impact on fabrication cost and complexity that would typically be associated with such performance attributes.

The module 100 can be integrated with a computing device, or in other examples, can be implemented as a discrete device that is removably connected to a computing device. In examples in which the module 100 is configured to be removably connected to a computing device, the module 100 includes a communications interface 104, such as a Universal Serial Bus (USB) port, configured to connect the remaining components of the module 100 to a host computing device (not shown).

The module 100 includes a primary board 108, which may also be referred to as a primary support. In the present example, the primary board 108 is a printed circuit board (PCB), for example fabricated with FR4 material, carrying either directly or via additional boards, the remaining components of the module 100. In particular, the primary board 108 carries, e.g., on a first surface 110 thereof (which may also be referred to as a top of the assembly 150), the above-mentioned communications interface 104.

The primary board 108 also carries, on the first surface 110, a baseband controller 112. The baseband controller 112 is implemented as a discrete integrated circuit (IC) in the present example, such as a field-programmable gate array (FPGA). In other examples, the baseband controller 112 may be implemented as two or more discrete components. In further examples, the baseband controller 112 can be integrated within the primary board 108 (i.e. be defined within the conductive layers of the primary board 108) rather than carried on the first surface 110.

In the present example, the baseband controller 112 is connected to the primary board 108 via any suitable surface-mount package, such as a ball-grid array (BGA) package that electrically couples the baseband controller 112 to signal paths (also referred to as leads, traces and the like) formed within the primary board 108 and connected to other components of the module 100. For example, the primary board 108 defines signal paths (not shown) between the baseband controller 112 and the communications interface 104. Via such signal paths, the baseband controller 112 transmits data received at the module 100 to the communications interface for delivery to a host computing device, and also receives data from the host computing device for wireless transmission by the module 100 to another computing device. Further, the primary board 108 defines additional signals paths extending between the baseband controller 112 and further components of the module 100, to be discussed below.

The module 100 further includes an interposer 120 carrying a radio controller 124. The interposer 120 is a discrete component mounted on the first surface 110 via a suitable surface-mount package (e.g., BGA). The interposer 120 itself carries the radio controller 124, and contains signal paths (also referred to as feed lines) for connecting control ports of the radio controller 124 to the baseband controller 112, and for connecting further control ports of the radio controller 124 to antenna elements to be discussed in greater detail below. The radio controller 124 may, for example, be placed onto or into the interposer 120 via a pin grid array or other suitable surface-mount package. In other examples, the radio controller 124 may be mounted directly on the first surface 110, e.g., via a BGA package, rather than being supported by the interposer 120.

The module 100 can also include a heatsink (not shown) placed over the baseband controller 112, the interposer 120 and the radio controller 124, and in contact with surfaces of those components, e.g., to exhaust heat generated by the components. In other examples, separate heat sinks may be placed over the baseband controller 112, and the combination of the interposer 120 and radio controller 124.

The radio controller 124 includes a transmit and a receive port for connection, e.g., via the interposer 120 and traces defined by the primary board 108, to the baseband controller 112. The radio controller 124 also includes a plurality of antenna ports for connection, via the interposer 120, to corresponding contacts on the first surface 110 of the primary board 108. Those contacts, in turn, are connected to elements of an antenna assembly integrated with the primary board 108, to carry signals between the radio controller 124 and the above-mentioned antenna elements. The construction of the antenna assembly itself will be described in greater detail further below.

Figure 1B:
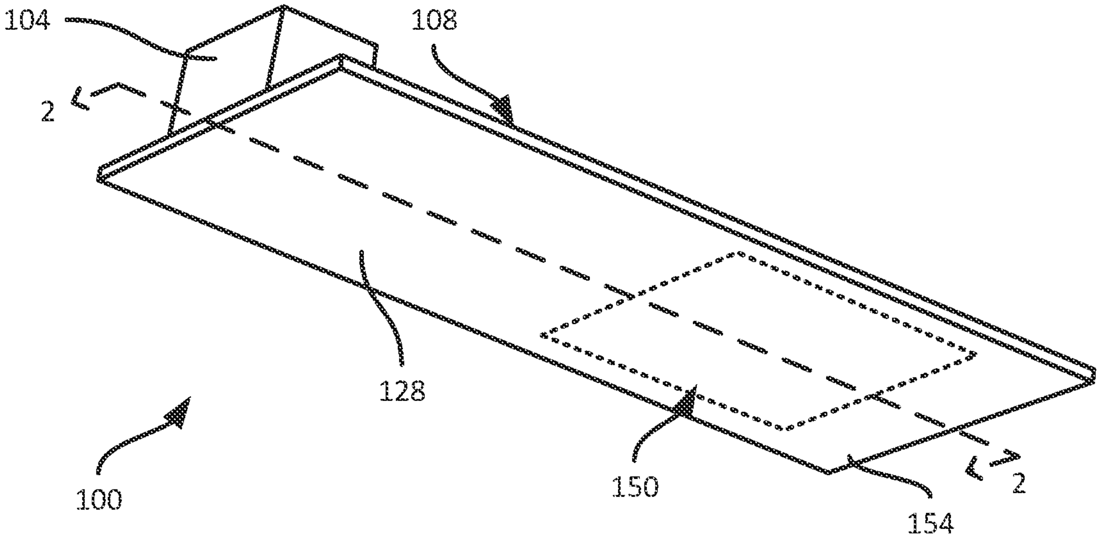

Turning to FIG. 1B, a second surface 128 (which may also be referred to as a bottom of the assembly 150) of the primary board 108 is shown opposite the first surface 110. The above-mentioned antenna elements are contained within an antenna assembly 150 that implements a phased array of antenna elements. As will be apparent to those skilled in the art, millimeter-wave phased arrays can be used to implement relatively low-cost solutions to the problems of high propagation loss and link blockage associated with wireless communications over the 60 GHz frequency band (e.g., utilizing the above-mentioned 802.11ay standard).

Such phased arrays include a set of radiating elements controllable to create a beam of radio waves that can be electronically steered in different directions, without mechanical movement of the radiating elements. Individual antenna elements are fed with respective RF signals having phase relationships such that the radio waves from the separate array elements combine to increase radiation intensity in a desired direction. Achieving sufficient gain and bandwidth coverage with such systems, while minimizing fabrication cost and complexity, may be challenging. For example, obtaining sufficient gain and bandwidth coverage using low-cost system-in-package (SiP) architecture and relatively thick board configurations (e.g., greater overall thickness than 1 mm, i.e. larger than 40% of the guided wavelength at 71 GHz) further complicates the design of such systems.

The antenna assembly 150 is integrated with the primary board 108 and places the above-mentioned radiating elements at or adjacent to the second surface 128. For example, as will be discussed in greater detail below, the antenna assembly 150 can include an eight-layer portion of the primary board 108, beginning at the second surface 128. The primary board 108 itself may include a greater number of layers than eight (or any other suitable number of layers employed by the antenna assembly 150). In the illustrated example, the primary board 108 includes eight layers, and thus the antenna assembly 150 as described below extends from the surface 128 to the surface 110. The antenna assembly 150 includes various features, to be discussed below in greater detail, enabling suitable performance for WiGig use to be achieved by the antenna assembly 150, while also enabling relatively low-cost fabrication of the antenna assembly 150 along with the remainder of the primary board 108.

Figure 2:
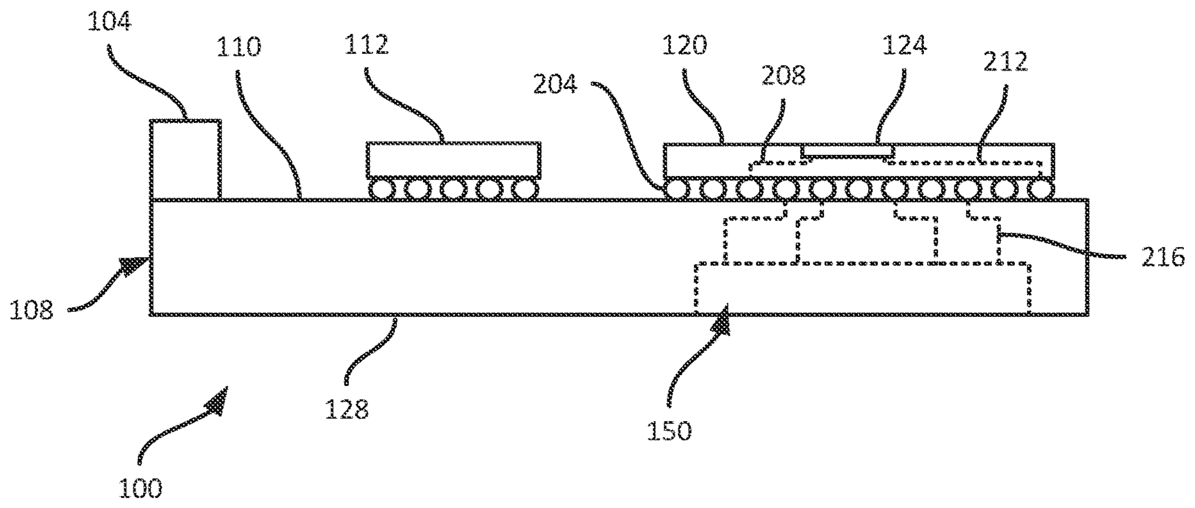
FIG. 2 depicts a cross-section of the system of FIG. 1.

Turning to FIG. 2, the cross-section 2-2 indicated in FIG. 1B is illustrated. As seen in FIG. 2, the interposer 120 is connected to the first surface 110 via a surface-mount package 204, which in the present example is a BGA package. The interposer 120 contains a plurality of internal feed lines, examples 208 and 212 of which are shown in FIG. 2, connecting control ports of the radio controller 124 to elements of the package 204 for electrical connection with control contacts on the first surface 110. At least a portion of the control contacts on the first surface 110 are connected to conduits (four example conduits 216 are shown) extending through the primary board 108 from the first surface 110 to the antenna assembly 150, which is adjacent to the second surface 128. In the illustrated example, the antenna assembly 150 forms a portion of the second surface 128. That is, some components of the antenna assembly 150 are at the second surface 128.

The conduits 216, also referred to as a feed network, convey signals from the radio controller 124 to the antenna assembly 150, which may include further internal conduits to route signals from the conduits 216 to individual elements of the antenna assembly 150. The conduits 216 may be implemented, for example, as strip lines.

Figure 3:
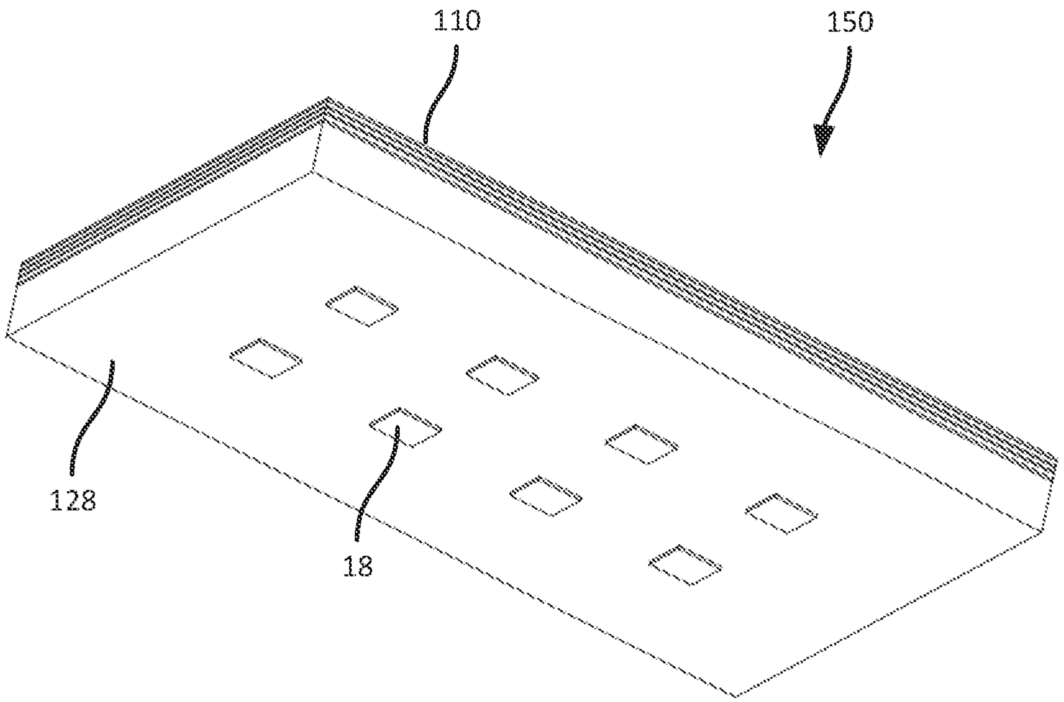
FIG. 3 is an isometric view of the antenna assembly of the system of FIG. 1, viewed from the bottom.

Turning to FIG. 3, the antenna assembly 150 is shown in isolation (i.e., FIG. 3 illustrates only the portion of the assembly 100 bounded by dashed lines in FIG. 1B), in approximately the same orientation as in FIG. 1B. In the illustration of FIG. 3, an outermost layer of dielectric material (e.g., FR4 or other suitable material) at the surface 128 has been omitted to more clearly reveal a set of patches or traces 18 that form a portion of the radiative components of the antenna assembly 150.

Figure 4:
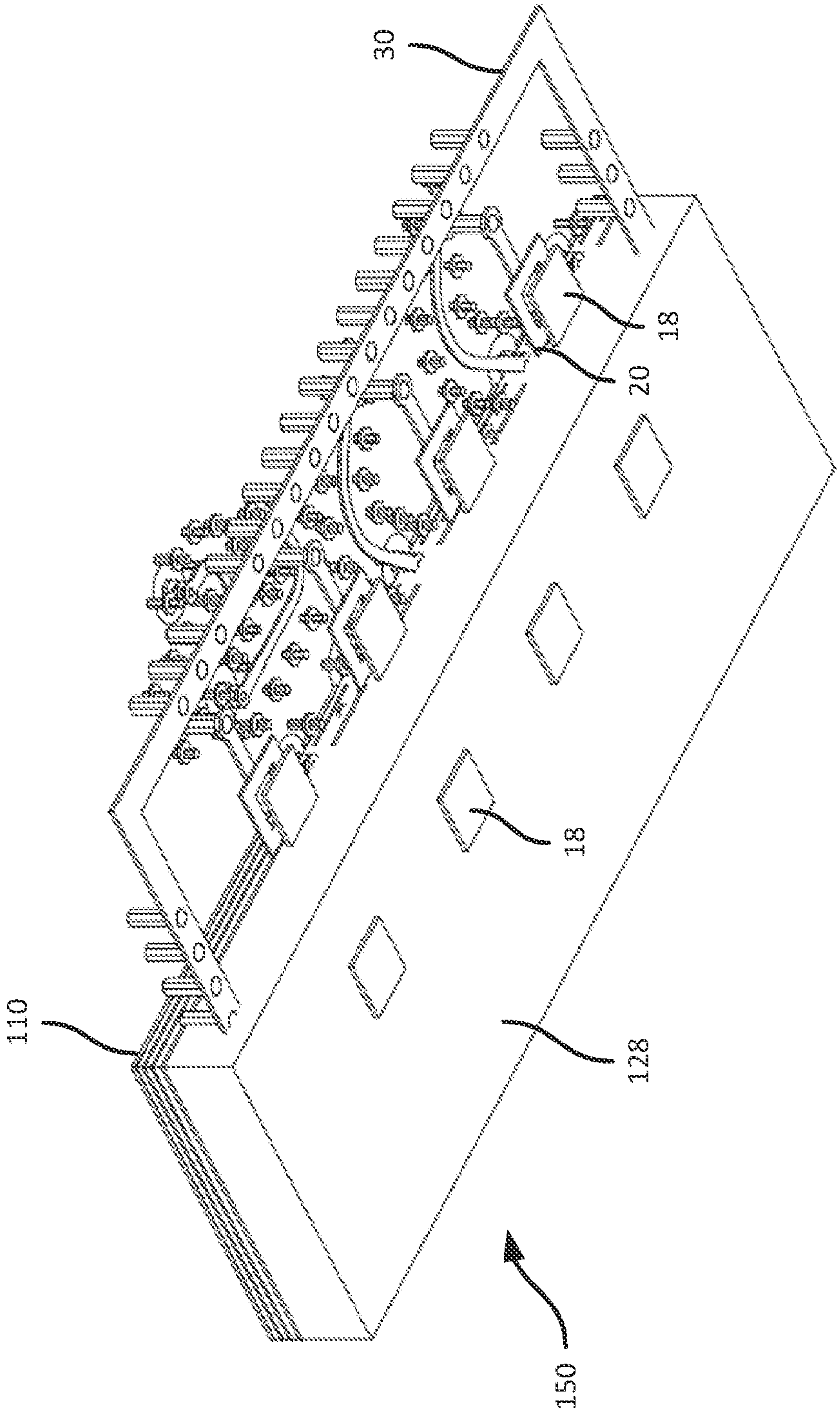
FIG. 4 is an isometric view of the antenna assembly as shown in FIG. 3, with a substrate thereof partially cut away to illustrate internal components.

FIG. 4 illustrates the assembly 150 with the substrate dielectric material sectioned away to reveal various internal components of the antenna assembly 150. In particular, in addition to the patches 18, a set of radiating rings 20 and an external ring 30 are visible in FIG. 4. As evident from FIG. 4, the antenna assembly 150 is formed as a multi-layer structure, e.g., by fabricating the structure on successive layers of a printed circuit board. In other examples, the antenna assembly 150 can be fabricated by other processes, e.g., as an integrated circuit (IC) fabricated on an IC wafer.

In some examples, the antenna assembly 150 is built by successively adding the layers discussed below, e.g., with a first layer forming the surface 128 and carrying the patches 18, and a final layer forming the surface 110 and carrying certain portions of a feed network interconnecting the interposer 120 and radio controller 124 with the radiating rings 20. Intermediate layers carry the radiating rings 20, external ring 30, as well as grounding connections for various components, feed network components, and the like. In other words, in the illustrated example the layers on which the radiating rings 20 and the external ring 30 are carried are embedded within the multi-layer printed circuit board.

Figure 5:
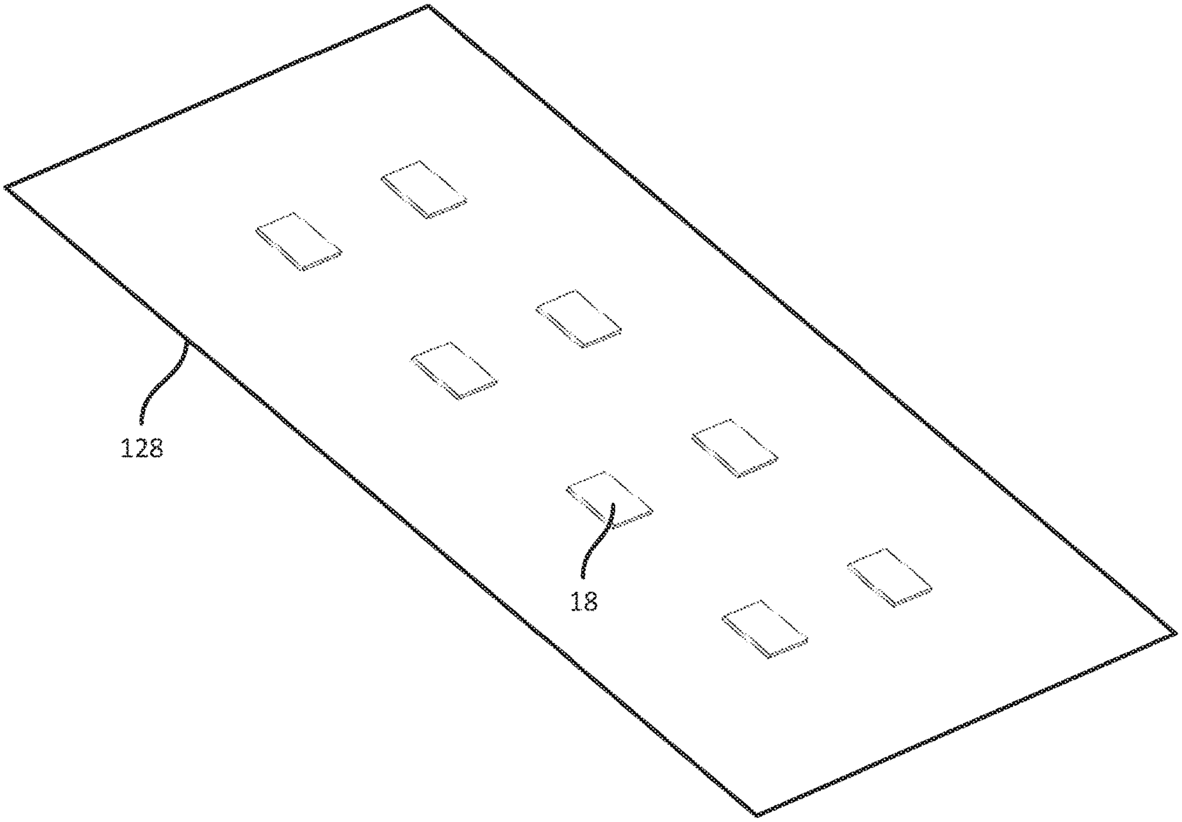
FIGS. 5 to 11 show sequentially added layers to the present printed circuit board, showing the structure of the system, as follows.
Figure 6:
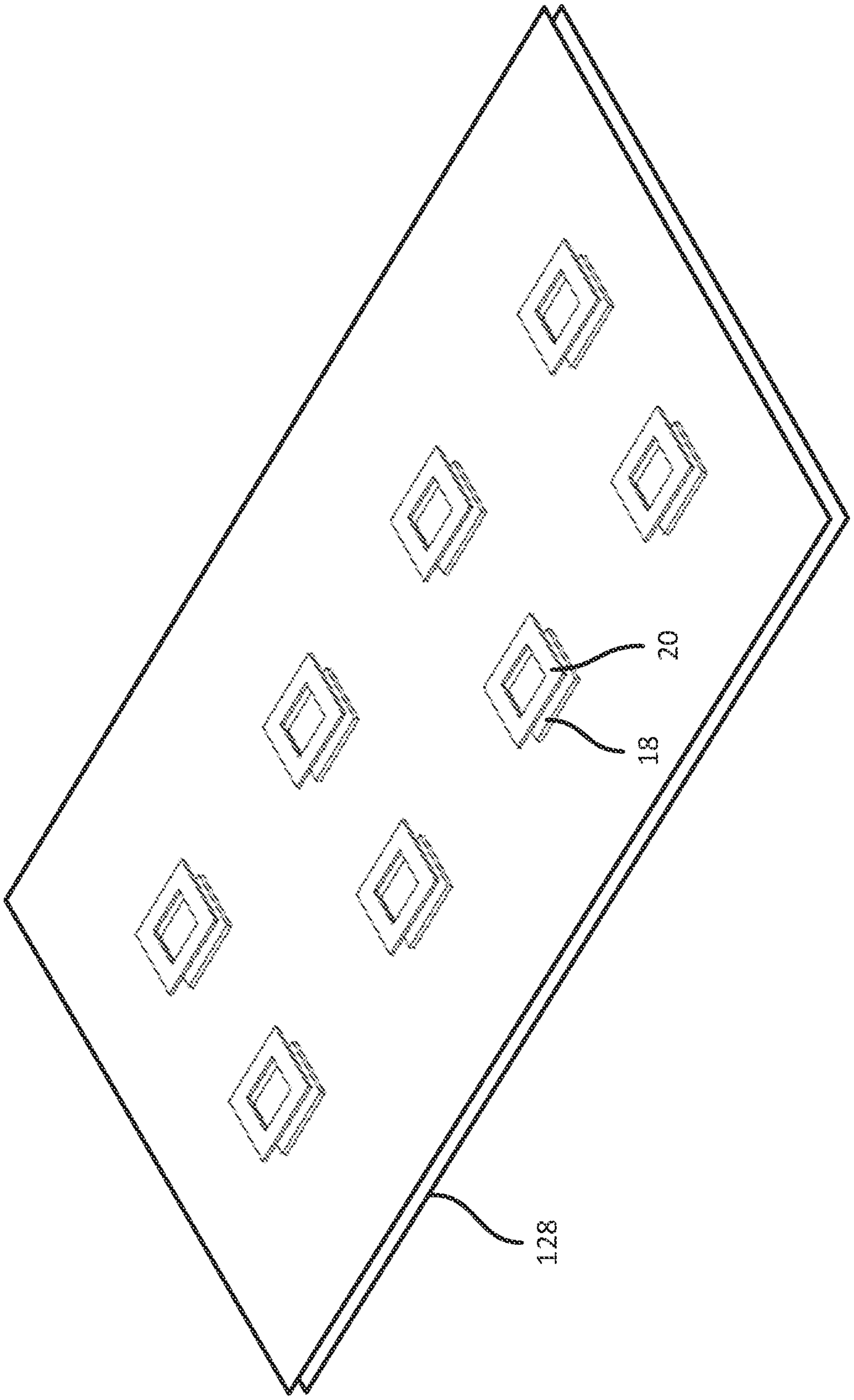
Figure 7:
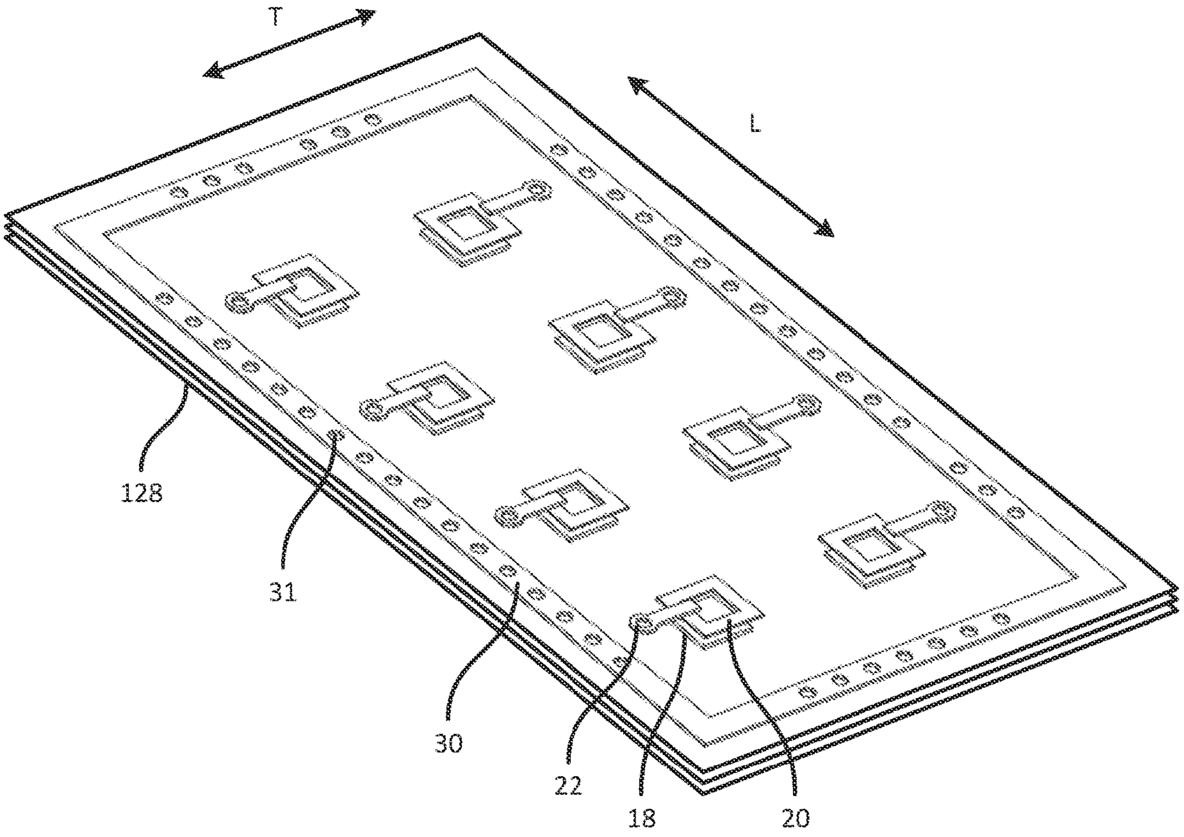

FIG. 5 shows a first layer (Layer 1) on which the previously mentioned eight copper traces 18 are printed. In the present example, a layer is fabricated over the layer shown in FIG. 5 that contains no conductive components. Next, as seen in FIG. 6, a third layer containing the radiating rings 20 is applied. As can be seen, each of the eight radiating rings 20 are positioned centered over the top of the respective copper traces 18. Next, as seen in FIG. 7, the Layer 4 is printed over the top of Layer 3. Layer 4 includes a grounded external ring 30 and connector leads 22 that connect to the feed network to control how each radiating ring 20 is driven by the radio frequency chip 124. External ring 30 can include via holes 31 for connecting external ring 30 to a ground plane (not shown).

It is to be understood that although the illustrated embodiment of the present antenna assembly has its external ring 30 and its radiating rings 20 printed on different layers, in other embodiments the external ring 30 and radiating rings 20 can be fabricated on the same layer.

Next, Layer 5 (FIG. 9), Layer 6 (FIG. 10), Layer 7 (FIG. 11) and Layer 8 (FIG. 12) are successively fabricated one over top of another. Layers 5 to 8 (FIGS. 9 to 12) represent various feed network layers electrically connecting the various elements of the antenna assembly 150. The vias 40 in FIGS. 8, 9 and 10 permit electrical connections therethrough to ground external ring 30.

FIG. 7 best illustrates a preferred embodiment of placement and sizing of the external ring 30 and radiating rings 20 with respect to one another, which may provide suitably high gain and sufficient bandwidth in a format that is also steerable.

In the illustrated preferred embodiment, the grounded external ring 30 is rectangular in shape and is positioned adjacent to the perimeter of assembly 10. The grounded external ring 30 is dimensioned to completely surround the radiating rings 20 as is shown. As can also be seen, the radiating rings 20 are preferably square in shape and are positioned within an area smaller than the perimeter of external ring 30.

As illustrated, the plurality of radiating rings 20 is eight radiating rings positioned in two rows of four radiating rings 20. One benefit of this is that the present assembly can thereby provide two distinct phased arrays that are independently controllable by radio frequency controller 124. As can also be seen, radiating rings 20 are preferably positioned equidistantly apart from one another in a longitudinal direction L (see FIG. 7) relative to external ring 30. This can be achieved by positioning connecting leads 22 at the center of an edge of each radiating ring 20 while having leads 22 also positioned equidistant to one another and to the narrow sides of external ring 30. Also in other preferred aspects, radiating rings 20 are positioned generally equidistantly apart from one another in a transverse direction T relative to external ring 30. In these various embodiments, the radiating rings 20 are all generally seen to be evenly distributed apart from one another within the central open space of external ring 30.

Figure 8:
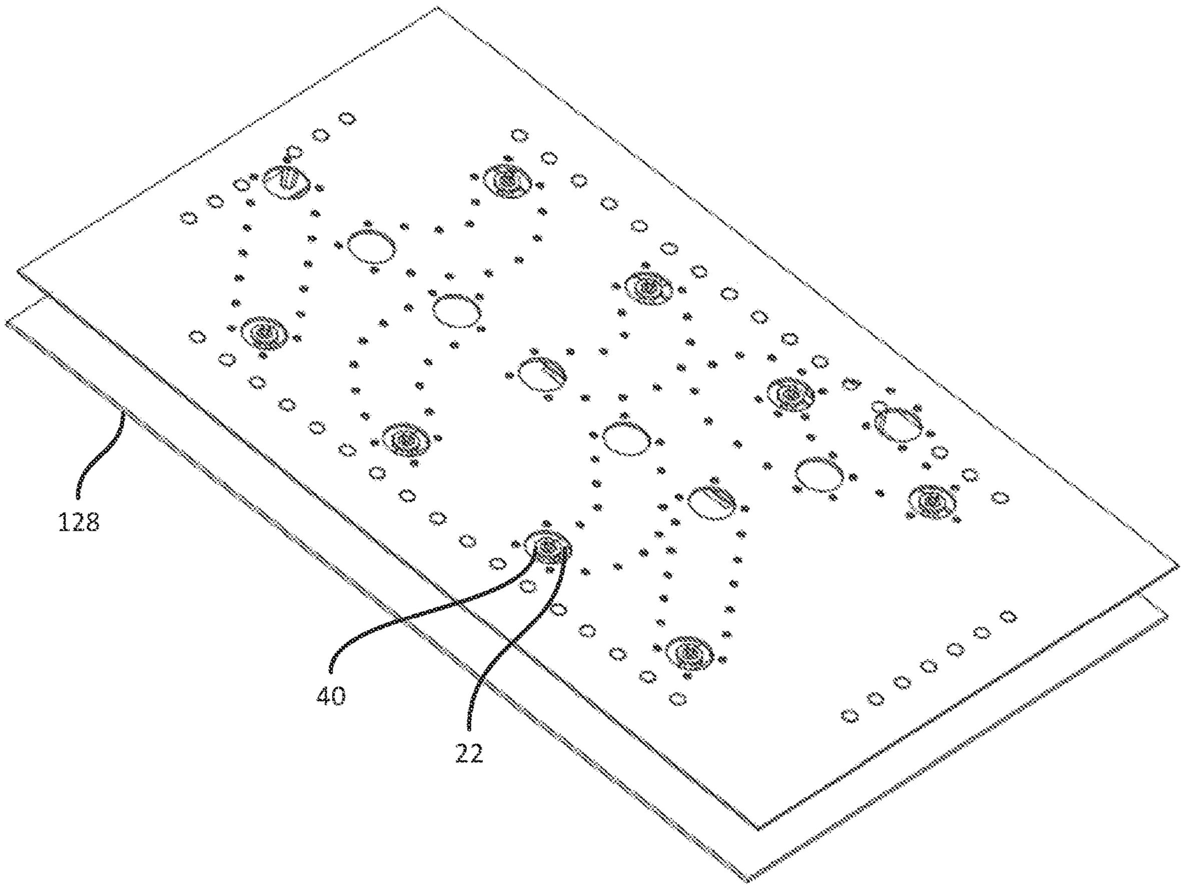

FIG. 8 illustrates various vias 40 passing therethrough to make electrical connections within the assembly. Vias 40 permit leads 22 to connect to radio frequency controller 124.

Figure 9:
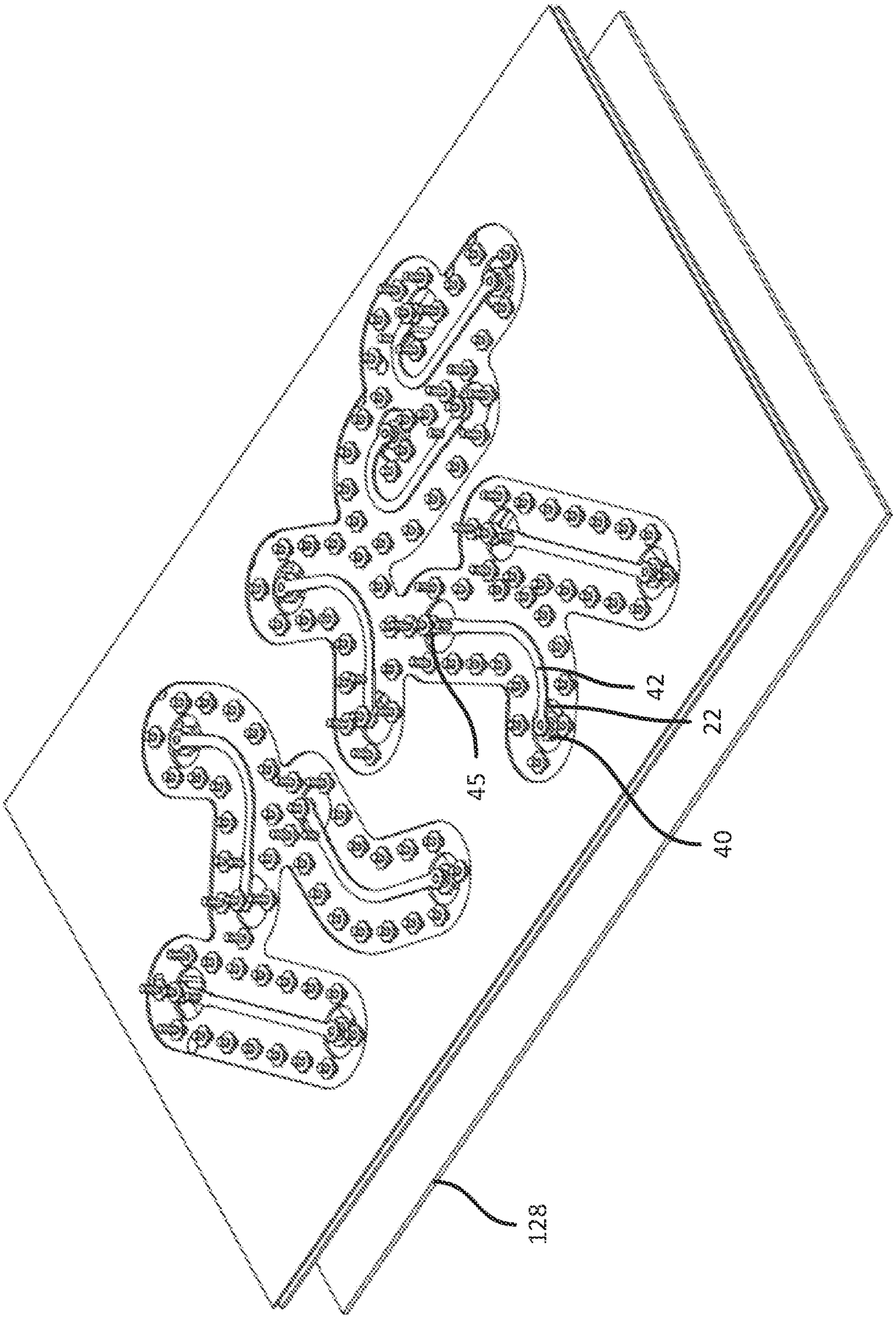

FIG. 9 shows various leads 42 used to electrically connect the radiating rings 20 to vias 45 that connect in turn to the radio controller 124. Leads 42 preferably are of the same lengths as one another, to thereby form part of a length-matched feed distribution network.

Figure 10:
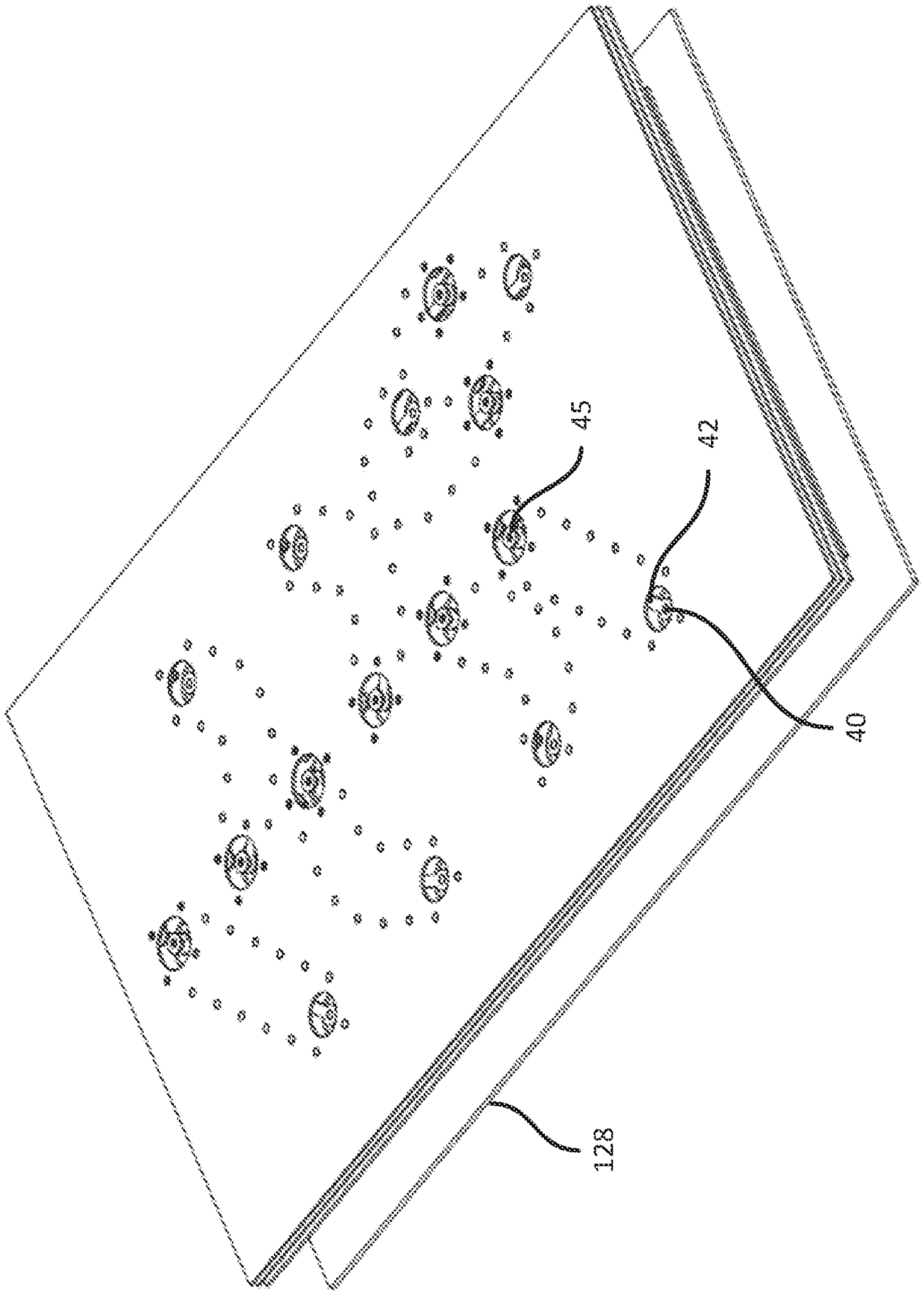

FIG. 10 illustrates various vias 40 passing therethrough to make electrical connections within the assembly.

Figure 11:
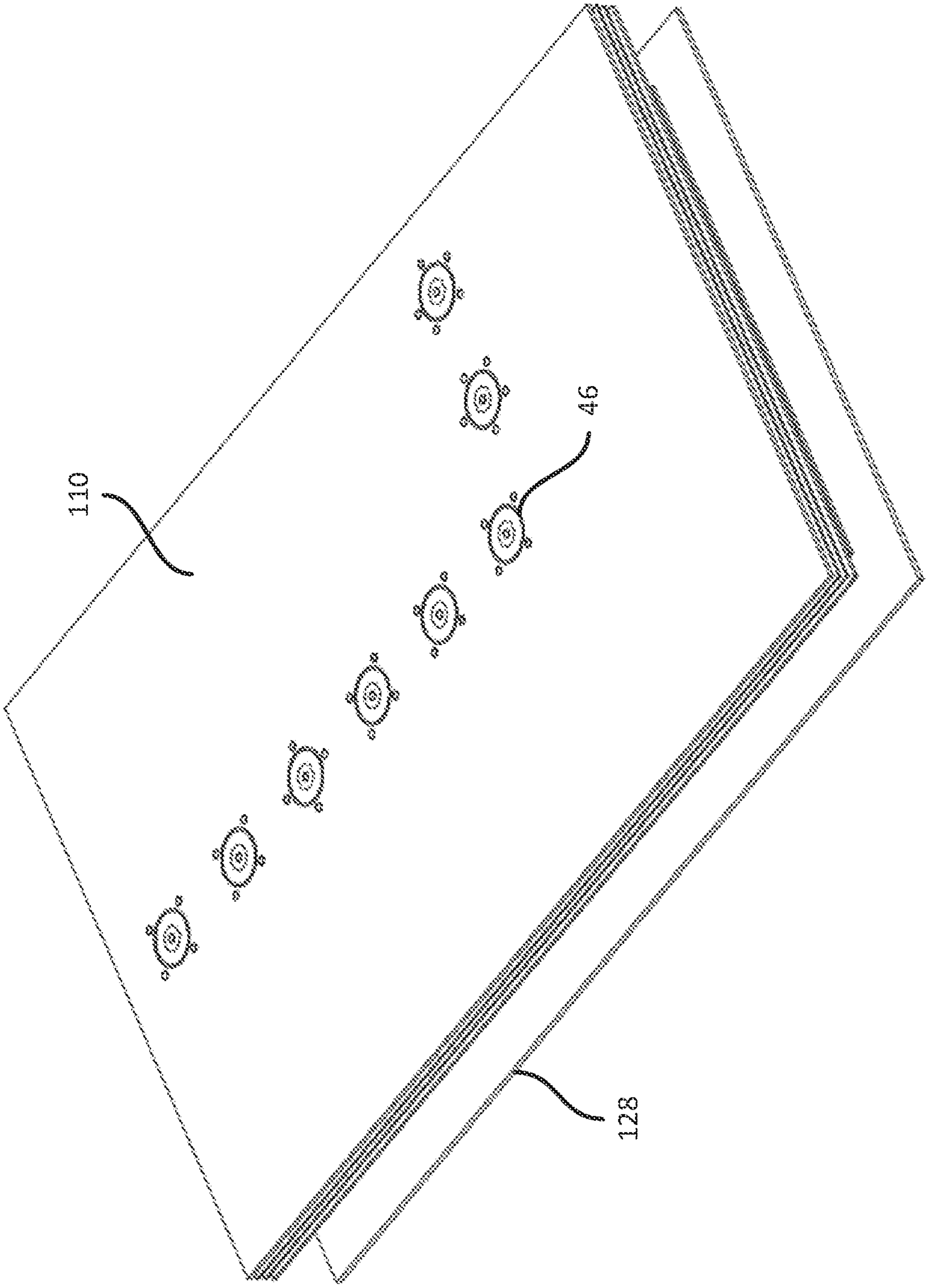

Finally, FIG. 11 illustrates a top layer 110 of the assembly 10 showing a plurality of conductive pads 46 that are connected by way of vias 45 to leads 42, and in turn to radiating rings 20. As such, conductive pads 46 act as contacts to interposer 120 and radio frequency controller 124.

The scope of the claims should not be limited by the embodiments set forth in the above example, but should be given the broadest interpretation consistent with the description as a whole.

What is claimed is:

1. An antenna assembly, comprising:

a supporting substrate including a multi-layer printed circuit board;

a plurality of radiating rings embedded within the multi-layer printed circuit board, the plurality of radiating are disposed on a first layer of the multi-layer printed circuit board;

an external ring embedded within the multi-layer printed circuit board, the external ring disposed on a second layer of the multi-layer printed circuit board and surrounding the plurality of radiating rings;

a plurality of patches in a third layer of the multi-layer printed circuit board, each patch centered relative to a respective one of the plurality of radiating rings; and a feed network connecting each of the plurality of radiating rings with a radio frequency controller.

2. The antenna assembly of claim 1, wherein the feed network is comprised of a plurality of layers on the multi-layer printed circuit board.

3. The antenna assembly of claim 1, further comprising:

the radio frequency controller, disposed on a top layer of the multi-layer printed circuit board, the radio frequency controller being in electrical communication with the radiating rings via the feed network, the radio frequency controller being configured to control operation of the radiating rings.

4. The antenna assembly of claim 3, further comprising:

a baseband chip disposed on the top layer, the baseband chip being in electrical communication with the radio frequency chip.

5. The antenna assembly of claim 4, wherein the radio frequency chip and the baseband chip are attached to the top layer with ball grid arrays.

6. The antenna assembly of claim 1, wherein the external ring is rectangular in shape and is positioned adjacent to the perimeter of the assembly.

7. The antenna assembly of claim 1, wherein the radiating rings are square in shape.

8. The antenna assembly of claim 1, wherein the wherein the plurality of radiating rings is eight radiating rings.

9. The antenna assembly of claim 8, wherein the eight radiating rings are positioned in two rows of four radiating rings.

10. The antenna assembly of claim 9, wherein the eight radiating rings are positioned equidistantly apart from one another in a longitudinal direction relative to the external ring.

11. The antenna assembly of claim 9, wherein the eight radiating rings are positioned equidistantly apart from one another in a transverse direction relative to the external ring.

12. The antenna assembly of claim 1, wherein the antenna assembly operates in a millimeter wave frequency of 30 GHz to 300 GHz.

13. The antenna assembly of claim 10, wherein the antenna assembly operates in a WiGig frequency range of 57 to 71 GHz.

14. The antenna assembly of claim 3, wherein the plurality of radiating rings are all connected to the radio frequency chip using a length-matched feed distribution network.

15. The antenna assembly of claim 1, wherein the external ring is positioned at a layer in the multi-layer printed circuit board between the layer of the plurality of radiating rings and the plurality of feed network layers.

* * * * *